United States Patent Office 3,536,790
Patented Oct. 27, 1970

3,536,790
METHYL n-BUTYL 2,2-DICHLOROVINYL PHOSPHATE
Charles A. Horne, Jr., Juan G. Morales, and Richard R. Whetstone, Modesto, Calif., assignors to Shell Oil Company, New York, N.Y., a corporation of Delaware
No Drawing. Filed July 21, 1967, Ser. No. 654,960
Int. Cl. C07f 9/08; A01n 9/36
U.S. Cl. 260—957                                    1 Claim

ABSTRACT OF THE DISCLOSURE

Methyl n-butyl 2,2-dichlorovinyl phosphate, useful as a mosquito larvacide.

BACKGROUND OF THE INVENTION

Field of the invention

This invention relates to a novel organophosphorus compound, and its use for controlling insects, particularly mosquitoes.

Description of the prior art

Dialkyl 2,2-dichlorovinyl phosphates are a known class of insecticides: U.S. Pat. 2,956,073; U.S. Pat. 3,116,201. However, they generally—as a class—exhibit relatively low to moderate toxicity to mosquito larvae.

DESCRIPTION OF THE INVENTION

It has been discovered that in contradistinction to other members of the class of dialkyl 2,2-dichlorovinyl phosphates, the particular compound, methyl n-butyl 2,2-dichlorovinyl phosphate, is highly active with respect to mosquito larvae.

This unexpected and surprisingly high activity was demonstrated as follows:

Sufficient of a 1% acetone solution of the compound was dissolved in 100 milliliters of water to provide the desired concentration of the compound. Ten fourth-instar *Anopheles albimanus* larvae were introduced into each of two replicates. The larvae were exposed to the solution of the compound for twenty-four hours, then mortality counts were made. Various concentrations of the compound were used to determine the $LC_{50}$ concentration. At the same time, similar tests were conducted with respect to parathion, as a standard. The results were reported in terms of the Toxicity Index, which is the ratio of the $LC_{50}$ dosage of the test compound to the $LC_{50}$ dosage of the standard, multiplied by 100.

It was found that the Toxicity Index of methyl n-butyl 2,2-dichlorovinyl phosphate was 267, indicating that it was 2.67 times (267%) as active as parathion.

In contrast, the toxicity indices of the following related compounds were as follows:

| Compound: | Toxicity index |
|---|---|
| Methyl isolbutyl 2,2-dichlorovinyl phosphate | 3 |
| Methyl sec-butyl 2,2-dichlorovinyl phosphate | 31 |
| Methyl propyl 2,2-dichlorovinyl phosphate | 12 |
| Methyl isopropyl 2,2-dichlorovinyl phosphate | 6 |
| Methyl pentyl 2,2-dichlorovinyl phosphate | 20 |
| Dipropyl 2,2-dichlorovinyl phosphate | <1 |
| Dibutyl 2,2-dichlorovinyl phosphate | 0.8 |
| Dimethyl 2,2-dichlorovinyl phosphate | 3 |

It is accordingly evident that the compound of the invention is markedly more active as a mosquito larvicide than the closely related homologs and analogs.

In addition, methyl n-butyl 2,2-dichlorovinyl phosphate has been found to be a broad spectrum insect toxicant, with activity particularly with respect to the housefly, the pea aphid, the rice weevil, the corn earworm, and the 2-spotted spider mite.

The compound of the invention can be used for controlling insects, and formulated as necessary for this purpose, according to conventional practice, such being set out in detail in U.S. Pat. 3,116,201.

For example, the compound can either be sprayed or otherwise applied in the form of a solution or dispersion, or it can be absorbed on an inert, finely-divided solid and applied as a dust. Useful solutions for application by spraying, brushing, dipping, and the like, can be prepared by using as the solvent any of the well-known inert horticultural carriers, including neutral hydrocarbons such as kerosene and other light mineral oil distillates of intermediate viscosity and volatility. Adjuvants, such as spreading or wetting agents, can also be included in the solutions, representative materials of this character being fatty acid soaps, resin salts, saponins, gelatin, casein, long-chain fatty alcohols, long chain alkyl sulfonates, phenol ethylene oxide condensates, ammonium salts, and the like. These solutions can be employed as such, or, more preferably, they can be dispersed or emulsified in water and the resulting aqueous dispersion or emulsion applied as a spray. Solid carrier materials which can be employed include talc, bentonite, lime, gypsum, pyrophyllite and similar inert solid diluents. If desired, the compound of the present invention can be employed as an aerosol, as by dispersing the same into the atmosphere by means of a compressed gas.

The concentration of the compound to be used with the above carriers is dependent upon many factors, including the carrier employed, the method and conditions of application, and the insect species to be controlled, a proper consideration and resolution of these factors being within the skill of those versed in the insecticide art. In general, however, the compound of this invention is effective in concentrations of from about 0.01% to 0.5% based upon the total weight of the composition, though under some circumstances as little as about 0.001% or as much as 2% or even more of the compound can be employed with good results from an insecticidal standpoint. Concentrates suitable for sale for dilution in the field and/or for ultra-low volume spray application may contain as much as 25–50% by weight, or even more, of the insecticide.

Because of the very high level of its toxicity to mosquito larvae, to control such larvae it is necessary to provide in the water habitat of the larvae dosages of the compound of the invention of the order of 0.003 part per million by weight (this is the $LC_{50}$ dosage) or somewhat greater—say up to 0.001 to 0.005 part per million. Of course, larger dosage can be used to make very sure all of the larvae are killed.

When employed as an insecticide, the compound of this invention can be employed either as the sole toxic ingredient of the insecticidal composition or can be employed in conjunction with other insecticidally-active materials. Representative insecticides of this latter class include the naturally-occurring insecticides such as pyrethrum, rotenone, sabadilla, and the like, as well as the various synthetic insecticides, including DDT, benzene hexachloride, thiodiphenylamine, cyanides, tetraethyl pyrophosphate, diethyl - p - nitrophenyl thiophosphate, dimethyl 2,2-dichlorovinyl phosphate, 1,2-dibromo-2,2-dichloroethyl dimethyl phosphate, azobenzene, and the various compounds of arsenic, lead and/or fluorine.

The compound of this invention can be prepared by reacting dimethyl butyl phosphite with chloral, according to the method of U.S. Pat. 2,956,073.

Alternatively, the compound can be prepared by reacting P,P'-di(2,2-dichlorovinyl) P,P'-dimethyl pyrophosphate with n-butyl alcohol, this method of preparation being illustrated by the following specific preparations.

In this example, "parts" means parts by weight, unless otherwise specifically indicated, parts by weight being the same relationship to parts by volume as does the kilogram to the liter.

EXAMPLE I

Preparation of P,P'-di(2,2-dichlorovinyl) P,P'-dimethyl pyrophosphate (a) Preparation of methyl sodium 2,2-dichlorovinyl phosphate.—Sodium iodide and dimethyl 2,2-dichlorovinyl phosphate, in the molar ratio of 1:1.1 were dissolved in acetone. The solution was refluxed for 30 minutes, then cooled, partially stripped of acetone, and cooled in a Dry Ice/acetone bath. Methyl sodium 2,2-dichlorovinyl phosphate crystallized out, as a white solid melting at 213–214° C., with decomposition. It was identified by elemental analysis, and the identity was confirmed by infrared spectrum analysis.

(b) Preparation of methyl hydrogen 2,2-dichlorovinyl phosphate.—Methyl sodium 2,2-dichlorovinyl phosphate was dissolved in methanol. A stoichiometrically equivalent amount of anhydrous hydrogen chloride was slowly introduced into the thoroughly stirred solution. The reaction was mildly exothermic, and the reaction mixture was cooled to maintain the mixture at 30° C. After addition of the hydrogen chloride, the mixture was stirred for an additional 15 minutes, then the precipitate of sodium chloride that had formed was filtered off. The liquid phase was stripped of methanol to leave a straw-colored oil, identified by elemental analysis and infra-red spectrum analysis as methyl hydrogen 2,2-dichlorovinyl phosphate.

(c) Preparation of P,P'-di(2,2-dichlorovinyl) P,P'-dimethyl pyrophosphate.—206.97 parts of methyl hydrogen 2,2-dichlorovinyl phosphate were mixed with 750 parts by volume of thionyl chloride, and the mixture was refluxed for 5 hours. The excess thionyl chloride then was stripped off at 45° C. and 20–25 torr. The residue was redissolved in carbon tetrachloride and then was restripped first at 45° C. and 20 torr, and then under high vacuum, to leave a straw-colored oil. This was distilled in a molecular still to a kettle temperature of 125° C., 0.0001 torr. The distillate was subjected to elemental analysis:

Analysis (percent by weight): P, 15.0; Cl, 35.1. Calculated analysis for the anhydride: P, 15.7; Cl, 35.9.

The identity of the product was confirmed by infra-red spectrum analysis.

Nuclear magnetic resonance analysis indicated the product to contain 80–90% P,P'-di(2,2-dichlorovinyl) P,P'-dimethyl pyrophosphate.

EXAMPLE II

Preparation of methyl butyl 2,2-dichlorovinyl phosphate (a) 20 parts of P,P'-di(2,2-dichlorovinyl) P,P'-dimethyl pyrophosphate and 4.3 parts of n-butyl alcohol were mixed. Two drops of concentrated sulfuric acid was added. The solution warmed to 68° C. It was allowed to cool slowly, with stirring. Total reaction time was one hour. The mixture then was mixed with 150 parts by volume of methylene chloride and the combined mixture was washed twice with 50 parts by weight of aqueous sodium bicarbonate solution. The aqueous washings were extracted with methylene chloride, the methylene chloride solutions were combined, dried and the solvent stripped off under water aspirator vacuum at 35° C. The pale yellow oil product was Claisen distilled to a pot temperature of 118–122° C., 0.02 torr. It was identified as methyl butyl 2,2-dichlorovinyl phosphate by elemental analysis:

Analysis (percent by weight)—calculated: P, 11.8; Cl, 27.0. Found: P, 12.0; Cl, 26.3.

The identity of the product was confirmed by infra-red spectrum analysis. Nuclear magnetic resonance analysis indicated the product to be more than 95% methyl butyl 2,2-dichlorovinyl phosphate.

(b) 123 parts of n-butanol was added slowly to 600 parts of P,P'-di(2,2-dichlorovinyl) P,P'-dimethyl pyrophosphate. The reaction was mildly exothermic, the reaction mixture temperature rising to 70° C., then allowed to fall to 60–65° C., where the stirred mixture was held for 3 hours. The mixture was cooled, diluted with 1000 parts by volume of methylene chloride and washed three times with 300 parts by volume of aqueous sodium bicarbonate solution. The aqueous phase was separated, extracted with 300 parts by volume of methylene chloride, the methylene chloride solutions were combined, dried, filtered and stripped under water aspirator vacuum to 35° C. The residue was distilled in a molecular still to 115° C., 0.0004 torr, the product of the distillation being methyl butyl 2,2-dichlorovinyl phosphate.

Analysis (percent by weight)—calculated: P, 11.8; Cl, 27.0. Found: P, 11.4; Cl, 26.7.

This experiment established that use of the sulfuric acid as catalyst was not necessary.

We claim as our invention:
1. Methyl n-butyl 2,2-dichlorovinyl phosphate.

References Cited

UNITED STATES PATENTS 2,956,073    10/1960    Whetstone _____ 260—957

FOREIGN PATENTS 1,251,745    10/1967    Germany.

OTHER REFERENCES

Derwent Belgian Patent Reports Nos. 22 and 23/67, July 21, 1967, 5: Gen. Org., P.I. Belgian Patent 689,778 omitted from Report No. 21/67 (OPI) May 2, 1967.

CHARLES B. PARKER, Primary Examiner

A. H. SUTTO, Assistant Examiner

U.S. Cl. X.R.

260—933, 971, 983, 988; 424—219